United States Patent [19]
Brovig

[11] 3,868,740
[45] Mar. 4, 1975

[54] VERTICAL, FREELY-SUSPENDED ROTARY BRUSHES FOR AUTOMOBILE/VEHICLE WASHING MACHINES

[75] Inventor: Aanen Brovig, Vagsbygd, Norway

[73] Assignee: Aa. Brovig A.S., Kristiansand, Norway

[22] Filed: June 4, 1973

[21] Appl. No.: 366,614

[30] Foreign Application Priority Data
June 13, 1972 Norway.............................. 2094/72

[52] U.S. Cl............................. 15/21 D, 15/DIG. 2
[51] Int. Cl............................................. B60s 3/06
[58] Field of Search............ 15/DIG. 2, 21 D, 21 E, 15/53

[56] References Cited
FOREIGN PATENTS OR APPLICATIONS
2,006,596  12/1969  Germany Primary Examiner—Edward L. Roberts
Attorney, Agent, or Firm—Pennie & Edmonds

[57] ABSTRACT

A brush for automobile washing machines wherein the shaft of the brush is rotatably mounted in a circular plate which, around the periphery thereof, is provided with an air-filled ring rigidly mounted to the frame of the washing machine. The circular plate is constituted by a standard automobile rim and the ring by a standard automobile tyre. A pressure indicator is mounted to the ring, the gauge of which is used as strength criterion for the operational speed of the machine.

6 Claims, 2 Drawing Figures

3,868,740

VERTICAL, FREELY-SUSPENDED ROTARY BRUSHES FOR AUTOMOBILE/VEHICLE WASHING MACHINES

The present invention relates to an improvement in rotary brushes for automobile/vehicle washing machines.

Brushes of the above said type are mounted in a mobile scaffold. The brushes may be suspended in the upper portion of the scaffold and movable in horizontal direction, said brushes being arranged in respective carriages which may be displaced along the upper portion of the scaffold, or they may be suspended horizontally and movable in vertical direction.

The automobile to be washed is positioned in the tracks of the washing machine and the scaffold is driven above the automobile while the brushes rotate and washing water is sprayed onto the automobile. There is constantly increasing need for greater capacity, and the speed of movement of the scaffold is constantly increased. The brushes are relatively large and heavy, for example, having a diameter of 80 – 90 cm and, if rigidly mounted, would readily damage the vehicle to be washed. On the other hand, great demands must be laid on the bearings of the brushes since great shock occurs when the said large brushes strike the surface of the automobile even though only with the bristles.

Attempts have been made to suspend said rotary brushes in various buffer and shock-absorber means, however, all previously proposed solutions have been expensive and complex.

The aim of the present invention is therefore to provide a simple and inexpensive suspension of rotating brushes, of the type described hereinabove, for automobile washing machines. In accordance with the invention, this is achieved by an improvement in rotary brushes for automobile washing machines characterized in that the shaft of the brush is rotatably mounted in a circular plate which, around its periphery, is provided with an air-filled ring rigidly mounted to the frame. A conventional automobile wheel has proved excellent for this use. A very inexpensive and solid construction is thereby provided. An automobile wheel is constructed to withstand extremely high loads and is mass-produced and therefore inexpensive. By constructing a holder for the external sole of the tire, it is possible to fill the tire with air to a suitable hardness and thereby clamp the sole of the tire to the holder and, by adjusting the air content, achieve differing shock absorbance in accordance with differing requirements.

The suspension of the rotary brushes in this manner costs a fraction of what such suspensions have previously cost.

A further feature of the invention relates to providing the air-filled ring with a pressure indicator the gauge of which is used as strength criterion of the operational speed of the machine. The air pressure varies with the load on the brush, and, by means of the above described means, the speed may be reduced or possibly stopped altogether when the load increases above a certain value.

The invention is further explained in the following with reference to the drawing where:

Figure 1:
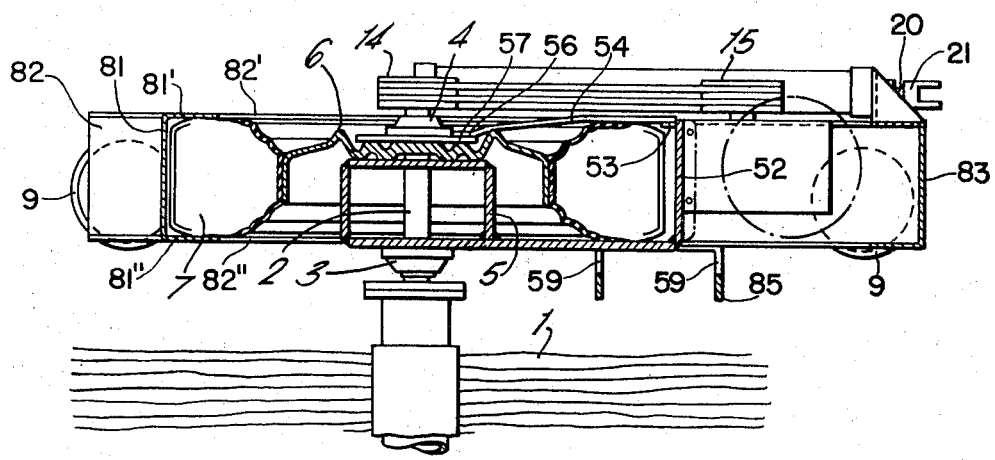
FIG. 1 is a vertical section through the means according to the invention.

A vertical, freely suspended rotary automobile brush 1 is, at its upper end, rigidly connected to a shaft 2 which is mounted in bearings 3 and 4. The lower bearing 3 is secured to a housing 5 which, at its upper side, supports an automobile rim 6. On the upper side of the automobile rim 6 the upper bearing 4 is secured. A tire 7 is mounted to the rim 6 and fastened, as described below, in one corner of a carriage 8.

The carriage or sub-frame 8 comprises parallel longitudinal frame members 82 and 84, and parallel cross members 81, 83 extending between and fixed at their ends to the longitudinal frame members 82 and 84. A third cross member 85 extends beneath longitudinal frame members 82 and 84 and has its ends secured to said longitudinal members 82 and 84.

As shown, the cross-member 81 is generally U-shaped in cross-section and has parallel arms 81' and 81''. Similarly, the longitudinal member 82 is of U-shape in cross-section and has parallel arms 82' and 82''. The arms 81' and 82' are spaced from the arms 81'' and 82'', respectively, by a distance corresponding to the width of the tire 7 which is received therebetween as shown. Thus, as viewed in FIG. 2, the tire 7 is supported on the left by the U-shaped channel member 81 and at the top by the U-shaped channel member 82. To the right as viewed in FIG. 2 the tire rests upon cross-brace 84 and is fixed with respect thereto by means of the brackets 12 and 13 which are fixed to the upper surface of the cross-brace 85 by means of bolts 17 or the like. At the bottom, as viewed in FIG. 2, the tire is secured by means of a bracket extending between the cross-brace 81 and the cross-brace 85 and secured thereto by the bolts 18 and 19, respectively.

Figure 2:
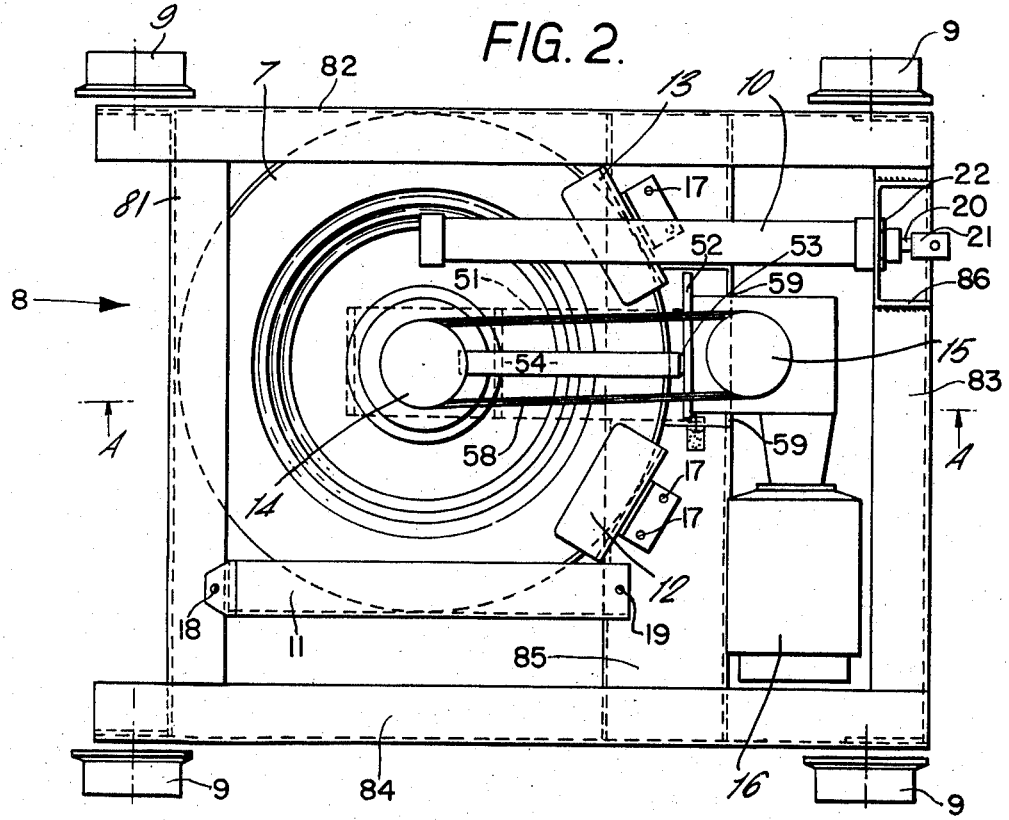
FIG. 2 is a view of the means seen from above.

The lower wall 51 of the housing 5 extends to the right as viewed in the drawings and beyond the periphery of the tire 7 has secured thereto, as by welding, an upright support plate 52. The cross-brace 85 is cut away at 59 to permit the plate 51 to extend to the right as shown in the figures. As best shown in FIG. 2, the cut away portion of the cross-brace 59 is considerably larger than the width of the plate 51 for reasons hereinafter set forth.

Adjacent its top the support plate 52 has an inwardly projecting flange 53 to which is secured one end of a brace 54 by any suitable means such as welding, bolting or the like. The brace 54 extends over the tire and rim toward the center and is secured at its other end 56 to the flange 57 of the bearing 4. This support plate 52 serves to mount and support a worm motor 16, the output of which is the belt pulley 15. Belts 58 connect the output pulley 15 of the worm motor 16 to pulleys 14 secured to the upper end of the shaft 2, whereby the motor 16 rotates the shaft 2 and the brush 1 thereon.

Wheels 9 are rotatably mounted on the carriage 8 and support the same for rectilinear movement from the cross-bars of the scaffold (not shown) of an automobile washing machine. A work cylinder 10 (which may be either hydraulic or pneumatic) provides the movement of the carriage 8 relative to said scaffold. The piston rod 20 is adapted to be secured to the rigid frame of the scaffold by means of the clevis 21. The cylinder 10 is fixed at 22 in any conventional manner to an upright support 86 welded to the cross-member 83 of the carriage 8, whereby movement of the piston rod 20 with respect to the cylinder 10 will move the carriage 8 relative to the fixed rigid frame of the scaffold.

It will be seen that by means of this suspension of the washing brush 1, it is substantially freely movable, within limits, in all directions, for the casing of the tire will give to absorb the movement and shock imparted to the shaft 2 of the brush 1 when it comes into contact with the various contours of the automobile body. In this regard, it should be noted that the worm motor 16 as well as its outlet pulley 15 are fixed with respect to the tire rim 6 and the shaft 2 and will move therewith. In order to provide considerable latitude with respect to the movement of the structure and particularly of the lower wall 51, the cut out 59 in the cross-member 85 is larger than the plate 51 as previously mentioned. By adjusting the air pressure of the tire 7, the mobility of the brush 1 may be increased or decreased within rather wide limits.

Having described my invention, I claim:

1. Apparatus for supporting a rotary brush of an automobile washing machine having a fixed frame comprising a sub-frame supported from said fixed frame, a circular plate, a shaft extending through the center of said circular plate and mounted for rotation with respect to said plate, a brush mounted to said shaft, means for rotating said shaft and brush, a flexible air-filled ring secured to said circular plate around the periphery thereof, said air-filled ring being supported by said sub-frame, and the periphery of said flexible air-filled ring being confined against substantial movement with respect to said sub-frame, whereby said brush is supported by said air-filled ring and movement other than said rotary movement when imparted to said brush during operation is transmitted to said air-filled ring and substantially absorbed thereby through flexing of said ring.

2. The apparatus of claim 1 to which said circular plate is an automobile wheel rim and said air-filled ring is an automobile tire mounted on said rim.

3. The apparatus of claim 2 in which said means for rotating said shaft is mounted in fixed relationship to said circular plate.

4. The apparatus of claim 3 in which said sub-frame is a carriage mounted for reciprocation with respect to said fixed frame, and including means for so reciprocating said sub-frame.

5. The apparatus of claim 4 in which the pressure of the air in said tire may be adjusted to control the degree of movement of said brush.

6. The apparatus of claim 1 in which said means for rotating said shaft is mounted in fixed relationship to said circular plate.

* * * * *